(12) United States Patent
Kumada

(10) Patent No.: US 11,547,901 B2
(45) Date of Patent: Jan. 10, 2023

(54) SLIDING BALANCE BOARD

(71) Applicant: Kazumine Kumada, Ishikawa (JP)

(72) Inventor: Kazumine Kumada, Ishikawa (JP)

( * ) Notice: Subject to any disclaimer, the term of this patent is extended or adjusted under 35 U.S.C. 154(b) by 115 days.

(21) Appl. No.: 17/086,363

(22) Filed: Oct. 31, 2020

(65) Prior Publication Data

US 2022/0016478 A1 Jan. 20, 2022

Related U.S. Application Data

(60) Provisional application No. 63/053,629, filed on Jul. 18, 2020.

(51) Int. Cl.
| | | |
|---|---|---|
| *A63C 17/04* | (2006.01) | |
| *A63B 22/16* | (2006.01) | |
| *A63C 17/01* | (2006.01) | |
| *A63C 17/00* | (2006.01) | |
| *F16D 41/069* | (2006.01) | |

(52) U.S. Cl.
CPC ............ *A63B 22/16* (2013.01); *A63C 17/006* (2013.01); *A63C 17/014* (2013.01); *F16D 41/069* (2013.01)

(58) Field of Classification Search
CPC ....... A63C 17/014; A63C 17/04; A63C 17/08; A63C 2203/06; A63B 26/003; A63B 22/16; F16D 41/069
USPC ........................................................ 280/229
See application file for complete search history.

(56) References Cited

U.S. PATENT DOCUMENTS

| | | | | |
|---|---|---|---|---|
| 3,630,540 A | * | 12/1971 | Smith .................... | A63B 22/16 482/146 |
| 5,839,737 A | * | 11/1998 | Kruczek ................ | A63C 17/01 280/258 |
| 7,172,044 B2 | * | 2/2007 | Bouvet .................. | A63C 17/12 180/181 |
| 11,260,926 B2 | * | 3/2022 | Schneider .............. | B62J 43/16 |
| 2008/0242515 A1 | * | 10/2008 | Odien .................. | A63B 26/003 482/146 |
| 2015/0297975 A1 | * | 10/2015 | DiCarlo ............... | A63C 17/012 180/180 |
| 2018/0161661 A1 | * | 6/2018 | Ma ........................ | B62K 3/002 |
| 2018/0207511 A1 | * | 7/2018 | Kumada ................ | A63C 17/12 |

FOREIGN PATENT DOCUMENTS

GB 2570012 A * 7/2019 ........... A63C 17/014

* cited by examiner

*Primary Examiner* — Joshua T Kennedy
(74) *Attorney, Agent, or Firm* — Tillman Wright, PLLC; James D. Wright; David R. Higgins

(57) ABSTRACT

A sliding balance board has an eccentrically mounted center wheel as a pivotable central balancing member, a wheel with one-way sprag clutch bearings mounted near the left end of the board and a wheel with one-way sprag clutch bearings mounted near the right end of the board. A user balances himself/herself on the board, and yet slides the board to the left and right, back and forth by shifting his/her weight left and right, synchronized to the rocking motion of the eccentrically mounted center wheel.

13 Claims, 6 Drawing Sheets

SLIDING BALANCE BOARD

CROSS-REFERENCE TO RELATED APPLICATIONS

This application claims the benefit of Provisional Application No. 63/053,629, filed on Jul. 18, 2020, the disclosures of which are incorporated herein by reference.

BACKGROUND OF THE INVENTION

The present invention is in the technical field of sports and exercise equipment. More particularly, the present invention is in the technical field of a balance board. More particularly, the present invention is in the technical field of a balance board that includes a slide board exercises for developing the balancing ability and providing cardiovascular exercises for an individual user.

In conventional balance board in the said technical field, disclosed in U.S. Pat. No. 9,931,540, constructed with a board with a pivotable central balancing member which trains the users balancing ability and core muscles, a user requires to keep his/her balance on the board. However, there is a problem with such a construction that it is not possible for the user to perform cardiovascular exercises.

BRIEF SUMMARY OF THE INVENTION

The present invention is a sliding balance board constructed by a wheel which axle is eccentrically affixed and being mounted in the center of the board, and two wheels with one-way sprag clutch bearings, each of which being mounted near the left end of the board and near the right end of the board, enabling a user to balance on the board, and yet shift his/her weight left and right to slide the board back and forth.

It is an object of the present invention to provide a board exercise device that includes a balance board that trains the balancing ability which accelerates development of the core muscles and a slide board to perform cardiovascular sliding type of exercises.

BRIEF DESCRIPTION OF THE SEVERAL VIEW OF THE DRAWING

DETAILED DESCRIPTION OF THE INVENTION

The present invention relates to a sliding balance board that a user can stand and balance himself/herself on the board, and by shifting his/her weight left and right, synchronized to the rocking motion of an eccentrically mounted center wheel, the board slides to the left and right, back and forth. While the board is in balance mode, the eccentrically mounted larger center wheel functions as a pivotable central balancing member and two wheels with one-way sprag clutch bearings mounted near both ends of the board are hung in the air. And while the board is in a sliding mode, as a user shift his/her weight to the left or right, one of the wheels with one-way sprag clutch bearings touches the ground. The motion of shifting weight left or right brings eccentric axle at the top position and the motion of shifting weight to the opposite direction brings the eccentric axle at the down position, the eccentric axle being set between feet forces the wheel to turn one complete revolution.

The driving force of the board sliding to the left and right is generated by the continuous motion of the user shifting his/her weight left and right, causes the board repeatedly being pushed back and forth, synchronized to the rocking motion of the eccentrically mounted centerwheel. In order to cancel the back move created by the user and turn it into the board sliding forward, each time the user shifts his/her weight backwards, the one-way sprag clutch bearings on the wheel mounted to the sliding direction touching the ground cancel the back move, instead, the eccentric center wheel turns forward vigorously by the user's movement downward associated with the user's weight shifting backwards and thus the eccentrically mounted center wheel turns one revolution most efficiently when the user's motion is synchronized with the turn of the wheel.

Figure 1:
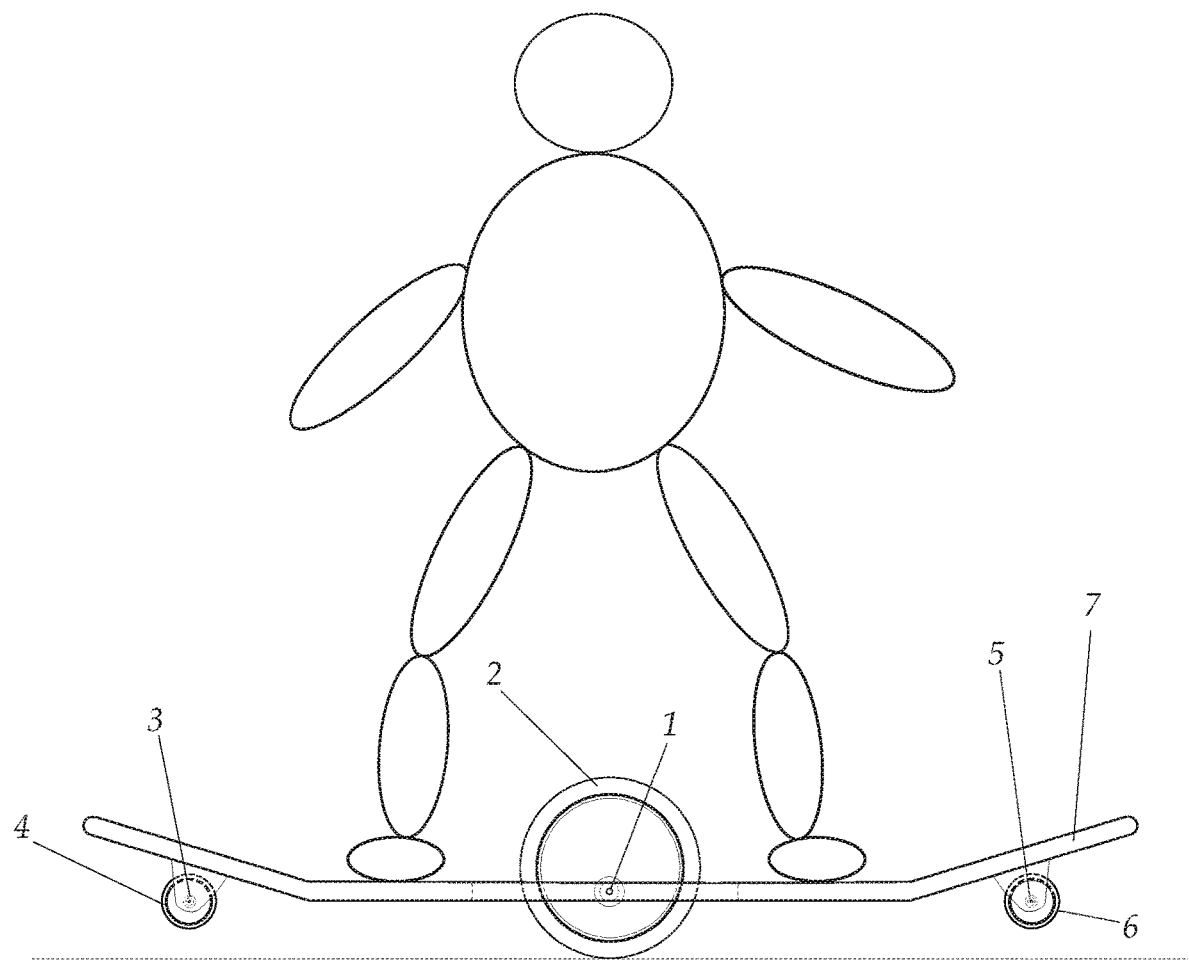
FIG. 1 is a front view of the sliding balance board of the present invention in balance mode.

FIG. 1 in the attached drawing is a front view of the sliding balance board in balance mode. An axle 1 mounted eccentrically on the center wheel 2 which is mounted in the center of the board 7, is in descending position and the wheel 2 functions as a pivotable central balancing member. One-way sprag clutch bearings 3 which turn freely anti-clockwise are attached to the wheel 4 mounted on near the left end of the board 7, one-way sprag clutch bearings 5 which turn freely clockwise are attached to the wheel 6 mounted on near the right end of the board 7 and both wheels are hung in the air.

Figure 2:
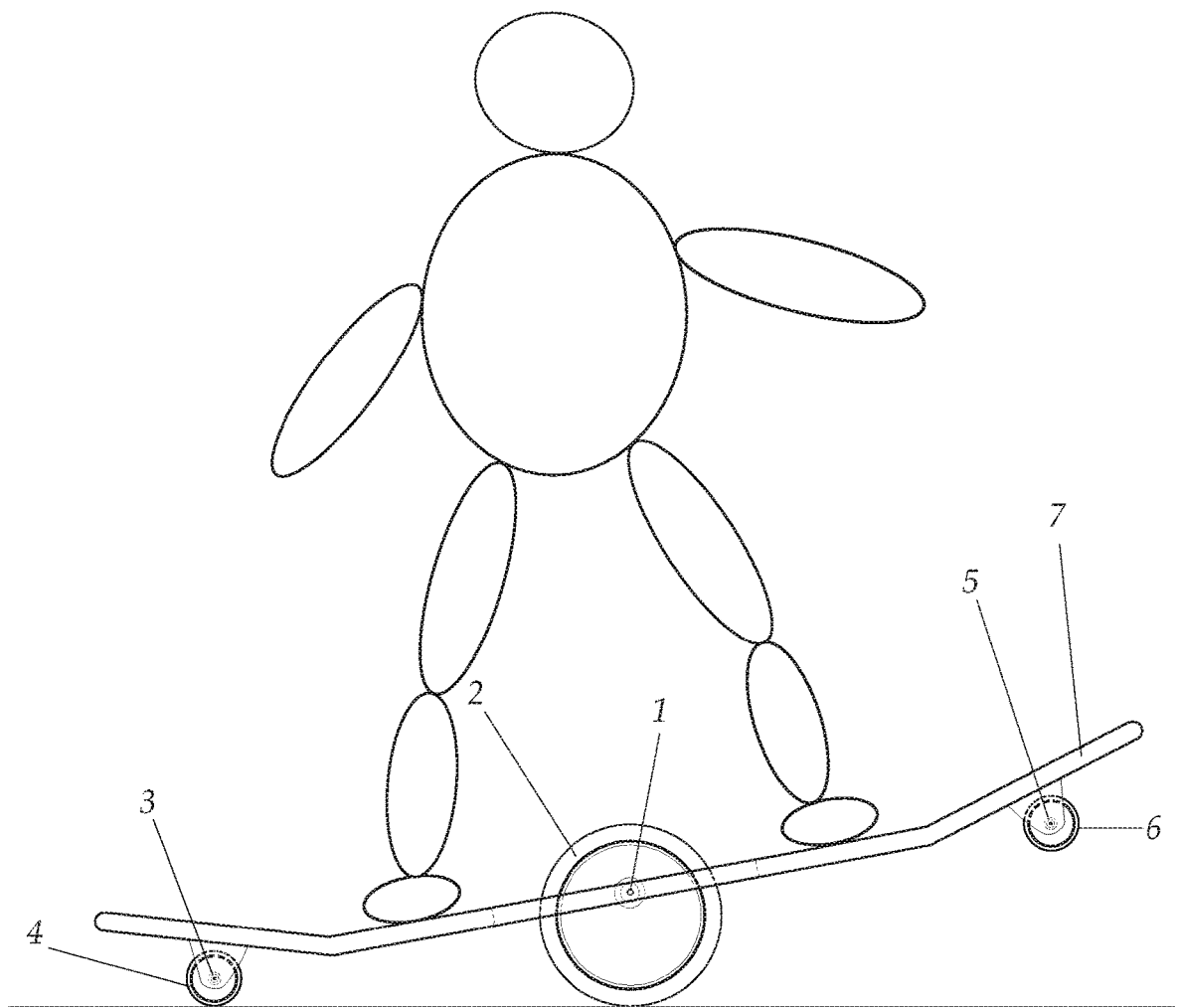
FIG. 2 is a front view of the sliding balance board in sliding mode to the left.

On FIG. 2 in the attached drawing is a front view of the sliding balance board in sliding mode. When the user shifts his/her weight to the left, the board 7 is tilted to the left and the wheel 4 mounted on the near left end of the board 7, with the one-way sprag clutch bearings 3, which turns freely anti-clockwise touches the ground. Only the driving force sliding to the left is allowed since the one-way sprag clutch bearings 3 only turn anti-clockwise.

Figure 3:
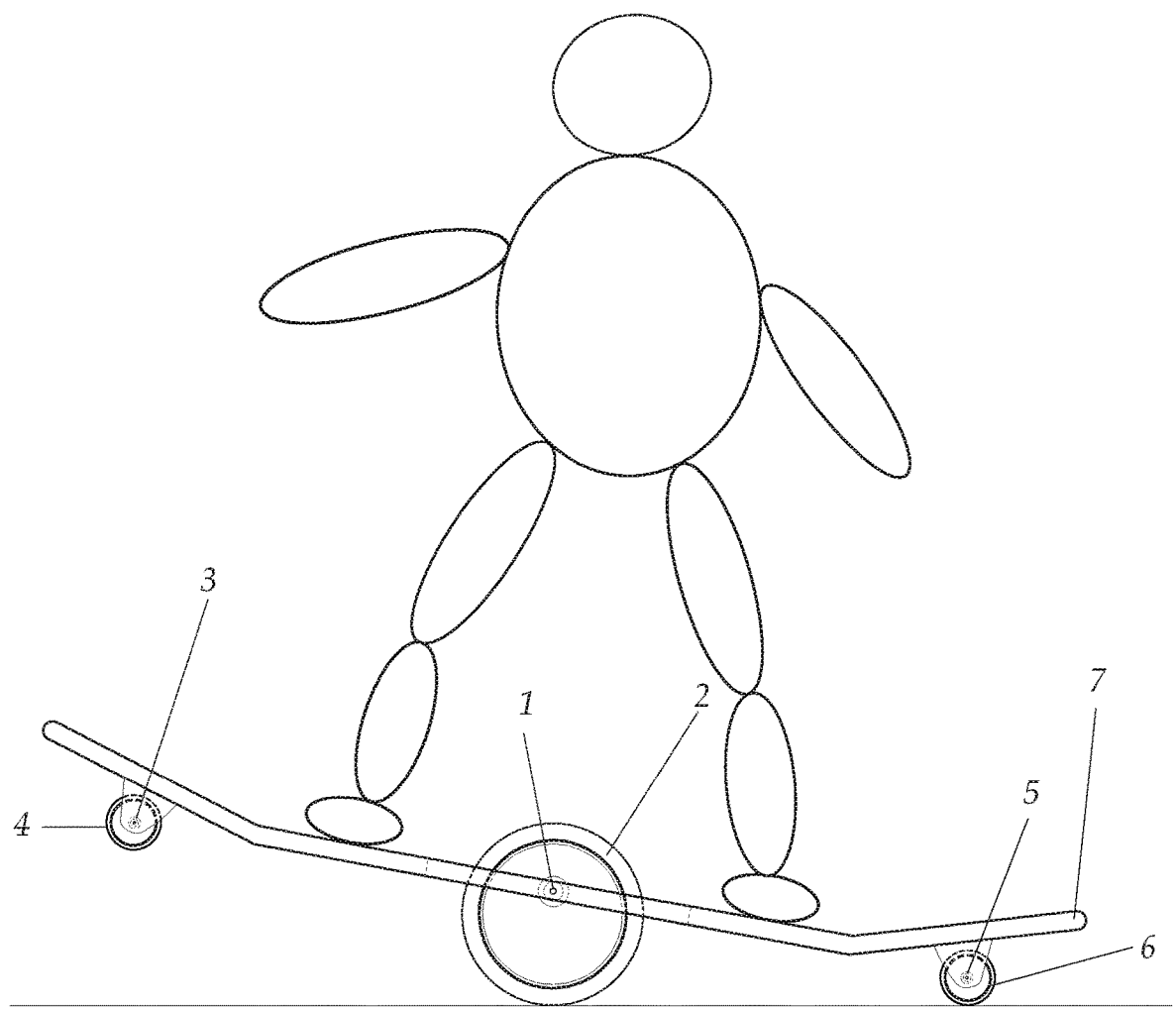
FIG. 3 is a front view of the sliding balance board in sliding mode to the right.

On FIG. 3 in the attached drawing is a front view of the sliding balance board in sliding mode. When the user shifts his/her weight to the right, the board 7 is tilted to the right and the wheel 6 mounted on near the right end of the board 7, with the one-way sprag clutch bearings 5, which turns freely clockwise touches the ground. Only the driving force sliding to the right is allowed since the one-way sprag clutch bearings 5 only turn clockwise.

Figure 4:
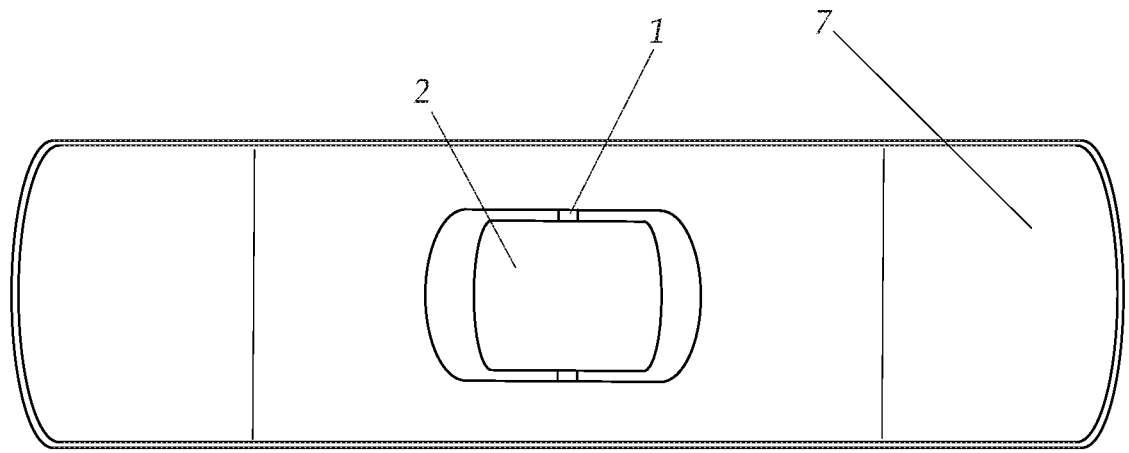
FIG. 4 is a top view of the sliding balance board.

On FIG. 4 in the attached drawing is a top view of the sliding balance board. The centerwheel 2 with an eccentrically mounted axle 1 is mounted in the center of the board 7.

Figure 5:
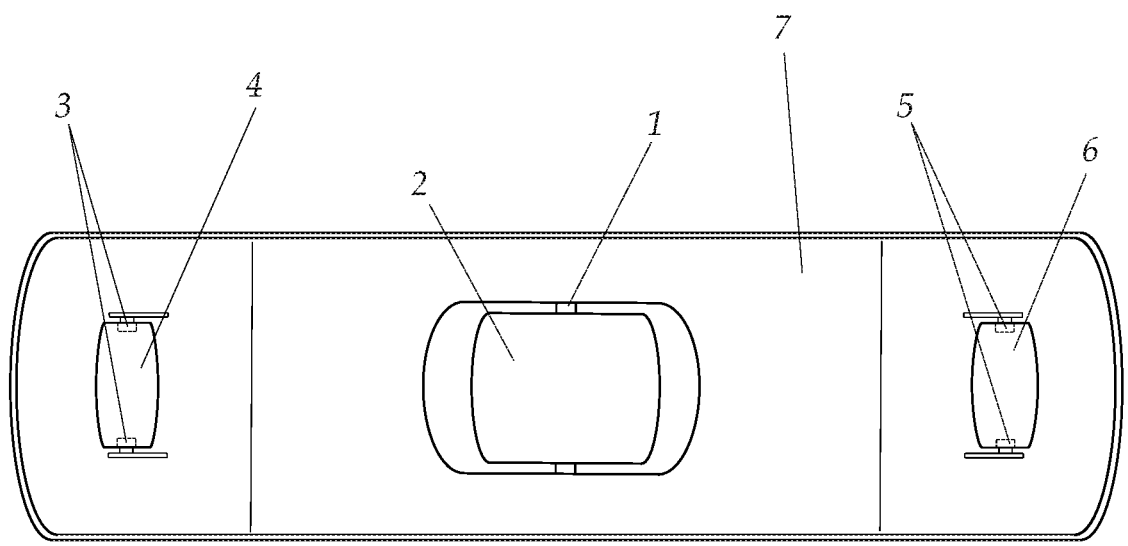
FIG. 5 is a bottom view of the sliding balance board.

On FIG. 5 in the attached drawing is a bottom view of the sliding balance board. The center wheel 2 with an eccentrically mounted axle 1 is mounted in the center of the board 7, the wheel 4 with the one-way sprag clutch bearings 3, which turns freely anti-clockwise is mounted to near the left end of the board 7, the wheel 6 with the one-way sprag clutch bearings 5, which turns freely clockwise is attached to near the right end of the board 7.

Figure 6:
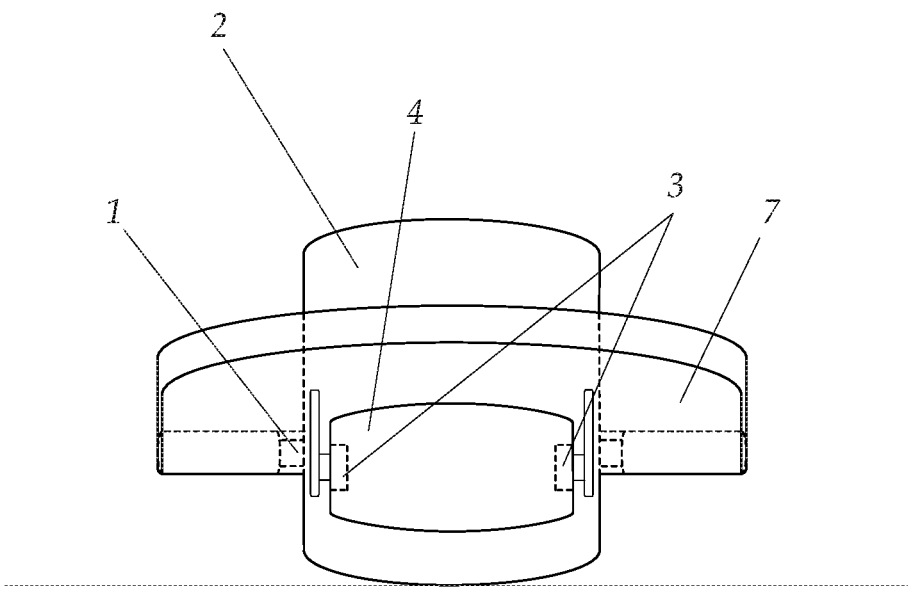
FIG. 6 is a left side view of the sliding balance board in balance mode.

On FIG. 6 in the attached drawing is a left side view of the sliding balance board in balance mode. The center wheel 2 with an eccentrically mounted axle 1 is mounted in the center of the board 7, the wheel 4 with the one-way sprag clutch bearings 3, which turns freely anti-clockwise is mounted near the left end of the board 7, and the wheel 4 is hung in the air.

Figure 7:
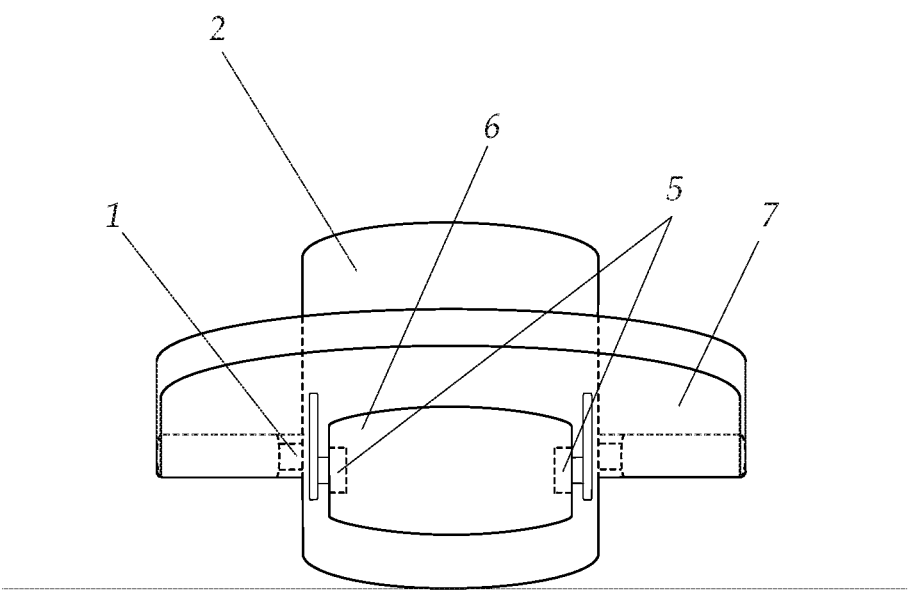
FIG. 7 is a right side view of the sliding balance board in balance mode.

On FIG. 7 in the attached drawing is a right side view of the sliding balance board in balance mode. The center wheel 2 with an eccentrically mounted axle 1 is mounted in the center of the board 7, the wheel 6 with the one-way sprag clutch bearings 5, which turns freely clockwise is mounted near the right end of the board 7, and the wheel 6 is hung in the air.

Figure 8:
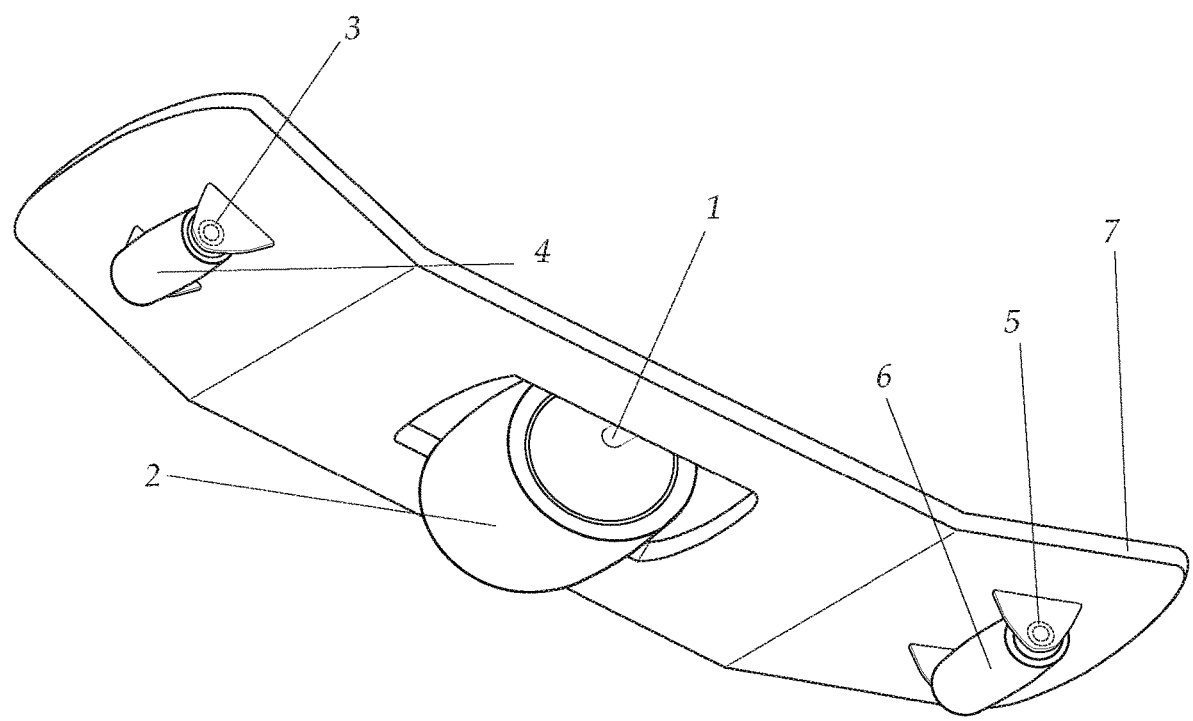
FIG. 8 is a perspective view of the sliding balance board.

On FIG. 8 in the attached drawing is a perspective view of the sliding balance board. An axle 1 mounted eccentrically on the center wheel 2 is mounted in the center of the board 7, the one-way sprag clutch bearings 3 which turn freely anti-clockwise are attached to the wheel 4 mounted on near the left end of the board 7, the one-way sprag clutch bearings 5 which turn freely clockwise are attached to the wheel 6 mounted on near the right end of the board 7.

An embodiment of the sliding balance board shown in FIG. 1, combines a board 7, a center large wheel 2, a left wheel 4 and a right wheel 6. Both end of the board 7 is vented upwards so as to create a gap between the ground and the left wheel 4 and the right wheel 6. The left wheel 4 and the right wheel 6 touches the ground only when the board is intentionally tilted sideways as shown in FIG. 2 and FIG. 3. One-way sprag clutch bearings are mounted to the left wheel 4 and the right wheel 6 to cancel the back move of a user but can also be used as a brake when needed.

The eccentric center wheel 2 turns with the user's weight shifting back and forth when in sliding mode, but also behaves as a pivotable central balancing member when in balance mode. By adjusting the distance from the center of the wheel 2 to the eccentrically mounted axle 1, one can change the difficulty to keep the balance on the board. The farther the eccentric axle 1 gets from the center of the wheel 2, the easier balancing on the board will be, since the eccentrically mounted axle 1 tends to keep staying down because of the Earth's gravity.

The term "axle" as used herein indicates a single or split shaft around which an object or objects may rotate.

The term "board" as used herein applies in a functional sense, and indicates a generally elongated structural member of little thickness. The preferred embodiment includes a board formed from carbon material. Other materials are available that would be suitable for use on their own or together with other materials for alternative embodiments of the present invention. Examples are wood, bamboo, metal, polymers, or composite materials such as carbon fiber, or fiberglass, or any other similar materials. Those in the art will understand that any suitable material, now known or hereafter developed, may be used in forming the boards described herein.

The invention claimed is:

1. A sliding balance board comprising:
a single board with a center wheel, wherein an axle is affixed eccentrically to said
a central opening located at a longitudinal and horizontal center of said board and a center wheel located within said central opening, wherein an axle is affixed eccentrically to said center wheel, wherein said axle is directly affixed to said board;
a first end wheel being affixed near a first end of said board; and
a second end wheel being affixed near a second end of said board.

2. The sliding balance board of claim 1:
wherein at least one one-way
sprag clutch bearing is affixed to the left wheel; and
wherein at least one one-way
sprag clutch bearing is affixed to the right wheel.

3. The sliding balance board of claim 1, wherein the first end of the board and the second end of the board are each vented or bent or curved upward so as to create a gap between ground beneath the board and first wheel or the second wheel, respectively.

4. The sliding balance board of claim 1, wherein the center wheel is sufficiently large such that a user may balance on the board with both the first wheel and the second wheel elevated above ground beneath the board in order to pivot the board, parallel to the ground, on the center wheel.

5. A sliding balance board comprising:
a single board with a first end, a second end, a central opening located at a longitudinal and horizontal center of said board, and a center wheel that is centrally located within said central opening between the first end and the second end,
wherein an axle is affixed eccentrically to said center wheel, wherein said axle is directly affixed to said board.

6. A sliding balance board, comprising:
a single board with a central opening located at a longitudinal and horizontal center of said board;
an axle directly affixed the board; and
a center wheel located within said central opening and having said axle affixed eccentrically to the center wheel.

7. The sliding balance board of claim 6, wherein the center wheel defines a center axis, wherein the center axis is a first axis, wherein the axle defines a second axis, and wherein the second axis is eccentrically offset from the first axis.

8. The sliding balance board of claim 6, further comprising:
a first wheel mounted near a first end of the board; and
a second wheel mounted near a second end of the board.

9. The sliding balance board of claim 8, wherein at least one one-way sprag clutch bearing is affixed to the first wheel.

10. The sliding balance board of claim 8, wherein at least one one-way sprag clutch bearing is affixed to the second wheel.

11. The sliding balance board of claim 8, wherein at least one one-way sprag clutch bearing is affixed to the first wheel, and wherein at least one one-way sprag clutch bearing is affixed to the second wheel.

12. The sliding balance board of claim 8, wherein the first end of the board and the second end of the board are each vented or bent or curved upward so as to create a gap between ground beneath the board and first wheel or the second wheel, respectively.

13. The sliding balance board of claim 8, wherein the center wheel is sufficiently large such that a user may balance on the board with both the first wheel and the second wheel elevated above ground beneath the board in order to pivot the board, parallel to the ground, on the center wheel.

* * * * *